Jan. 9, 1940.   E. A. WEAVER   2,186,054

COLOR PHOTOGRAPHY

Filed March 11, 1936

I  EXPOSE FILM TO SCENE FROM FRONT

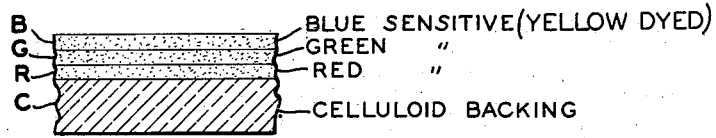

- B — BLUE SENSITIVE (YELLOW DYED)
- G — GREEN "
- R — RED "
- C — CELLULOID BACKING

II  DEVELOP  NEGATIVES IN RESPECTIVE LAYERS

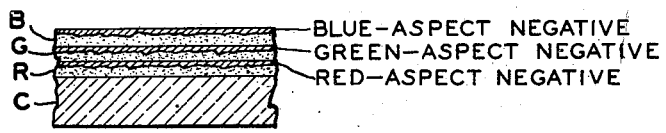

- B — BLUE-ASPECT NEGATIVE
- G — GREEN-ASPECT NEGATIVE
- R — RED-ASPECT NEGATIVE
- C

III  EXPOSE R LAYER WITH RED LIGHT THROUGH BACKING C

IV  DEVELOP  R POSITIVE IN CYAN (MINUS RED)

V  REMOVE DEVELOPED SILVER FROM ALL LAYERS

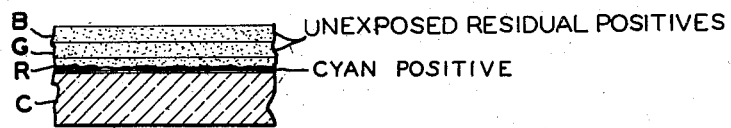

- B — UNEXPOSED RESIDUAL POSITIVES
- G
- R — CYAN POSITIVE
- C

VI  PARTIALLY EXPOSE G LAYER WITH GREEN LIGHT THROUGH CYAN POSITIVE AS MASK

VII  DEVELOP  G POSITIVE IN MAGENTA (MINUS GREEN)

VIII  FULLY EXPOSE G LAYER WITH GREEN LIGHT FROM EITHER SIDE

IX  DEVELOP  EXPOSED HALIDE AND REMOVE SILVER

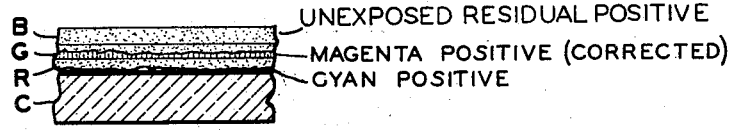

- B — UNEXPOSED RESIDUAL POSITIVE
- G — MAGENTA POSITIVE (CORRECTED)
- R — CYAN POSITIVE
- C

X  PARTIALLY EXPOSE B LAYER WITH BLUE OR WHITE LIGHT THROUGH CYAN AND MAGENTA POSITIVES AS MASKS

XI  DEVELOP  B POSITIVE IN YELLOW (MINUS BLUE)

XII  FULLY EXPOSE B LAYER WITH BLUE OR WHITE LIGHT

XIII  DEVELOP  EXPOSED HALIDE AND REMOVE SILVER

- B — YELLOW POSITIVE (CORRECTED)
- G — MAGENTA " "
- R — CYAN " "
- C

*Inventor:*
Eastman A. Weaver
By Roberts, Cushman & Woodbury
*Attys.*

Patented Jan. 9, 1940

2,186,054

UNITED STATES PATENT OFFICE 2,186,054

COLOR PHOTOGRAPHY

Eastman A. Weaver, Winchester, Mass., assignor to Comstock & Wescott, Inc., Cambridge, Mass., a corporation of Massachusetts Application March 11, 1936, Serial No. 68,223

11 Claims. (Cl. 95—2)

This invention relates to color photography and more particularly to color photography of the subtractive type involving the use of a subtractive film which records the different color aspects of the scene throughout the same area, although in certain aspects the invention may be utilized with other types of film.

To make an accurate subtractive three-color photograph without retouching, each of the three coloring-matters constituting the photograph should absorb one-third of the spectrum without appreciable absorption of the remaining two-thirds. For example, an ideal cyan (minus red) would absorb red light but neither green nor blue, an ideal magenta (minus green) would absorb green light but neither red nor blue, and an ideal yellow (minus blue) would absorb blue light but neither red nor green. However, the available coloring-matters do not in general meet these requirements. While there are yellow coloring-matters which absorb little if any light other than blue, the best available magenta color absorbs considerable blue light as well as green and the best available cyan absorbs both green and blue light as well as red. Indeed I have found that one of the best non-fugitive cyan coloring-matters for absorbing red light has approximately 50% as much absorption of green light and 25% as much absorption for blue light; and one of the best non-fugitive magentas for absorbing green light has approximately 50% as much absorption of blue light. Thus the best available cyan coloring-matter may be regarded as a mixture of ideal cyan and 50% as much ideal magenta and 25% as much ideal yellow, and the best available magenta as including 50% as much ideal yellow. The result is a certain falsification, chiefly a dulling or graying-down of colors, in reproduction.

The present invention diminishes the magenta image by amounts proportional to the density of the cyan image at each point and thus by amounts equivalent to the unwanted magenta component of the cyan image. It also diminishes the yellow image by amounts equivalent to the unwanted yellow components of the other two dyes. Of course the effect of such diminution on the quantitative balancing of images must be allowed for in forming the original emulsion, the development of the positives, redevelopment, etc.

More particularly this invention relates to film of the type in which a negative is first formed in a layer of emusion, leaving enough unexposed emulsion to form a corresponding positive, and then by any suitable reversal-process, involving reexposure and redevelopment, producing the corresponding positive in the same layer. Typical examples of such film are disclosed in the patent of Troland Reissue No. 18,680 and Capstaff No. 1,954,346, and in similar so-called monopack patents to Mannes and Godowsky, Gaspar, and others. For example, the film may comprise a transparent base carrying on one side thereof a plurality of coatings differently sensitized to record different color aspects of a scene. Usually three such coatings are provided, first a red-sensitized layer, secondly a superposed green-sensitized layer, and thirdly an ordinary blue-sensitive layer. Intermediate non-sensitized coatings may be provided to serve as filters or separators or both. By a single exposure in an ordinary camera latent negatives of three-color aspects are formed in the three layers respectively, leaving sufficient unexposed silver halide in each layer to form a corresponding positive by reversal. The layers are then subjected to suitable development to convert the exposed silver halide into silver, after which the silver is bleached out. Said unexposed silver halide is exposed or otherwise rendered developable and then, by suitable developing treatments, the positives are converted into colored pictures. The aforesaid patents disclose various methods of converting the latent positives into colored positives (by controlled diffusion, coupling reagents for color formation, color destroying agents, etc.), and the present invention is applicable to these various methods.

Objects of the present invention are to correct for the deficiency of available coloring-matters and more paticularly to effect such correction in films in which the images of different color aspects are produced in layers of emulsion fast together as in monopacks, and in which one or more of the images are composed of said imperfect coloring-matters.

According to the present invention each color-aspect positive emulsion which requires correction as aforesaid is given a masked exposure through the cyan positive as a mask and the tives which govern correction. In three-color photography, for example, the layer which is to be colored magenta is exposed with green light through the cyan positive as a mask and the layer which is to be colored yellow may also be exposed with blue or white light through both the cyan and magenta positives as masks. Inasmuch as the green light is absorbed by unwanted magenta component of the cyan image (more or less depending upon the particular wave-length of the green light as hereinafter explained) the cyan image casts a shadow, in exposing the magenta positive; likewise both the cyan and magenta positives cast shadows in exposing the yellow positive. Each layer whose positive is to be corrected is provided with more silver halide than required for both the original negative image and the corresponding positive to be formed therein. In exposing the layer to the scene, to form the negative, more unexposed silver halide is left than that required to form the positive; and then, in reexposing the layer to form the positive, the remaining unexposed silver halide is not fully exposed, whereby the masked exposure modifies the positive which would otherwise be determined solely by the previous negative exposure. The masked exposure is preferably made from the side of the layer opposite to that from which the original negative exposure is previously made. After the masked exposure is effected the corrected latent positive is developed in the appopriate color, either in a single developing and coloring stage or in successive developing and coloring stages. After the corrected positive has been developed in color its layer is fully exposed with light which affects only that layer; and then the layer is again developed in non-coloring developer to convert the remaining halide into silver, after which this silver is removed by bleaching.

It will be understood in this connection that the terms "positive" and "negative," as herein used, are referring to records of opposite signs and are not derived from the conventional term "negative" used for the first record of an original object field. For example, the records herein referred to as "negatives" could well be made from a negative record and therefore constitute positives in the above conventional sense.

In the case of monopack film the procedure preferably involves simultaneous partial exposure of the respective layers to the different color aspects of the scene to form latent negatives, simultaneous development of all the negatives, exposing the red-sensitive layer through the Celluloid base with red light to expose the previously unexposed silver halide, developing the positive of the red-sensitive layer in cyan (minus red) color, bleaching all the developed images to remove the silver, either wholly by dissolving out the silver or partially by converting it into transparent salt, partially exposing the green-sensitive layer with green light through the cyan positive as a mask, developing the positive in the green-sensitive layer in magenta (minus green) color, partially exposing the blue-sensitive layer with blue or white light through the cyan and magenta positives as masks, and developing the positive in the blue-sensitive layer in yellow (minus blue).

After the magenta has been developed in color its layer is fully exposed to green light, fully to expose all remaining silver halide, and this halide is developed in non-coloring developer and the developed silver is removed by bleaching. Likewise, after the yellow image has been developed in color its layer may be fully exposed to expose all remaining silver halide, and this halide may be developed without coloring and then removed by bleaching. Alternatively, ordinary fixing may take the place of this final exposure, development and bleaching.

By exposing the magenta positive through the cyan positive as a mask, the resulting magenta image is reduced in density where the cyan image is dense more than where it is faint, which is the correction required to effect diminution of the magenta coloring-matter in proportion to the corresponding densities of the cyan color; and by exposing the yellow positive through both the cyan and magenta images as masks, the yellow image is reduced in density in proportion to the corresponding densities of the cyan and magenta images. Of course the emulsion thicknesses and other controlling factors must be so proportioned that, in cooperation with the uncorrected positive or positives, each corrected positive has sufficient density, notwithstanding the aforesaid diminution, to render the neutrals of the original scene as neutrals in the resulting picture, throughout the whole scale from white to black.

The degree of masking of each positive used as a mask may be adjusted in many ways. For example, instead of effecting the masking exposure after the masking positive has been developed in color (either before or after all silver has been removed therefrom) it may be effected after development in silver and before replacement of the silver with coloring-matter, or, when using the cyan positive as a mask in exposing the green-sensitive layer, before the masking positive has been developed (while it is still in the form of silver halide—either before or after exposure of this halide). The degree of masking may also be controlled to some extent by varying the wave-length of the light employed in the masking exposure. For example, if the green light employed in the masked exposure of the magenta positive is near the yellow end of the green range, it is in general more heavily absorbed by the cyan positive than if near the blue end of the green range.

The present invention is useful not only in making a corrected monopack reproduction for use as such but also in making an over-corrected monopack reproduction for use as a stage product in making the ultimate corrected product by some other color photography method. For example the ultimate product may be made by imbibition printing upon an unsensitized gelatine layer from three different color-aspect matrices containing suitable dyes, such as yellow, magenta and cyan respectively; and these matrices may each be printed from the over-corrected monopack. The master monopack may be over-corrected sufficiently to compensate for the deficiencies of coloring-matter not only in itself but also in the subsequent imbibition print; indeed by further over-correction I may also compensate for similar deficiencies in the original color picture from which the over-corrected master monopack is made.

As explained above there are various ways of regulating the degree of correction, one of the simplest ways of increasing the corrective effect consisting in making the corrective or masked exposure after the masking image has been developed in color but before the silver has been removed therefrom. Since the effect of such increased correction is further to diminish the contrast of the corrected image, this diminution must be offset in order to preserve proper color balance. One way of offsetting the diminution is to provide more silver halide in the layer of emulsion when originally made. Another way involves the following procedure: After the aforesaid corrective exposure and development of the corrected positive in color, bleach the silver in the positive to a developable silver salt (using a bleach such as a ferricyanide which does not destroy the developed color) and then reapply the color developer to intensify the color image, subsequently removing the silver as herein described.

For the purpose of illustration a typical embodiment is shown in the accompanying drawing in which monopack film, treated according to the present invention, is shown in its original and final states and in various intermediate stages, the drawing being diagrammatic and not intended to show the exact conditions in the various stages, and the various steps of processing the film being listed between the illustrations. The drawing is a flow sheet indicating the various steps of the herein described embodiment of my invention.

The particular film chosen for the purpose of illustration comprises a Celluloid backing C, a first coating R of red sensitive emulsion, a second coating G of green sensitive emulsion and a third coating B of ordinary blue sensitive emulsion containing a yellow dye. As indicated by the legend I the film is exposed to the scene preferably from the front and as indicated by the legend II the three-color aspect negatives are then developed in the respective layers to produce the stage product illustrated following step II. In this illustration, and in the succeeding illustrations, the images are shown as confined to a partial depth of the layers of emulsion respectively, although it will of course be understood that even though the exposure is partial, exposing for example less than half of the sensitized particles in each layer, the partial exposure would extend more or less through the entire thickness of each layer, particularly in the high lights. However for the purpose of simplification of illustration each image is shown as confined to a partial depth of its layer of emulsion.

After the film has been exposed to the scene and developed the R layer is reexposed with red light, preferably through the backing C, thereby exposing the remaining silver halide in this layer. Then the cyan positive is developed in color, under the control of the exposed silver halide, to form the colored positive in known manner. The silver of the negative images is bleached and removed preferably at this stage, as well as that of the positive image in R, although the latter may be removed from the film either in the coloring process or subsequent thereto. At this stage of the process, as diagrammatically illustrated following step V, the layer R contains the finished cyan positive and the layers G and B contain positive images in sensitive silver halide, having had their negative images bleached out.

As indicated by legend VI on the drawing, the film is then partially exposed with green light through the cyan positive as a mask, partially to expose the remaining silver halide in the layer G. This exposed silver halide is then developed into magenta color. The layer G is then fully exposed with green light to expose the remaining silver halide in the layer, after which the halide is developed without color and the developed silver in the layer is removed. The film is then in the condition illustrated diagrammatically following step IX, containing the aforesaid cyan positive in layer R, the magenta positive in layer G and a bleached negative in layer B.

As indicated by legend X in the drawing, the layer B is then partially exposed with blue or white light to form the corrected yellow positive in latent form, this exposure being made through the backing C and through the cyan and magneta positives. The yellow positive is then developed in color, after which the remaining silver halide is removed by fixation or otherwise. As illustrated following step XIII the finished product comprises an uncorrected cyan positive in layer R, a corrected magenta positive in layer G and a corrected yellow positive in layer B.

The developer for producing the cyan positive in color is preferably of the type comprising trichlor-alpha-naphthol and paraphenylene diamine. The solvent for removing the metallic silver from the cyan positive after it is developed in color may for example comprise a weakly acidified solution of a bichromate. This solution may also be employed to remove silver in the other bleaching steps above referred to. The silver may be removed from the negatives before the cyan positive is formed, instead of being removed from the three negatives and from the cyan positive in a single step after the cyan positive has been developed in color, provided the red sensitizing of layer R is not destroyed by the bleach. The developer for the magenta positive is preferably of the type comprising a salt of brom-thio-indoxyl or of thio-indoxyl carboxylic acid. The developer for the yellow positive is preferably of the type comprising alpha-chlorethyl-aceto-acetate and diethyl-paraphenylene diamine. If desired the sensitivity of each layer may be restored or intensified, as for example by a bath in sodium sulphite or other alkaline solution or reducing agent, after its negative has been bleached and before its positive has been exposed.

If, in forming either the magenta or yellow positive, the unexposed silver halide remaining in the layer after formation of the corresponding negative were fully exposed, the aforesaid correction could not be effected. However, by only partially exposing the remaining silver halide through the previously formed positive or positives, the character of the corrected positive is controlled not only by the previous removal of negative silver from its layer but also by the masking effect of the previously formed positive or positives through which the positive to be corrected is exposed.

In case the monopack film is not to be converted to a color-positive but is to serve as a negative from which to print color positives, for instance by printing on similar monopack stock, a similar method of correction may be used. For example, controlled diffusion or some such method of distinguishing between images at different depths may be used. A preferred process is as follows: After original exposure the monopack is developed in a cyan-coloring developer, fixed and bleached in a controlled-diffusion bleach which, after destroying the cyan color and bleaching the silver to light-sensitive halide in the two upper emulsion layers, is quickly stopped by a fast-diffusing stop-bath such as weak ammonia, all of course in the dark. Inasmuch as the procedure up to this point is disclosed by the prior art (see e. g., British patent to Kodak Limited No. 427,520/32), more detailed description is unnecessary for the purpose of this disclosure. Following the aforesaid procedure a controlled partial light-exposure is applied through the cyan image, and the film is developed with magenta coloring developer. The film is then fully exposed to light and developed in a non-coloring developer, thereby to dispose of the remaining undeveloped halide in the intermediate layer. The color-destroying bleach is again applied for a short time sufficient only to convert the surface layer, and after the stop-bath a partial exposure may be given through the two color images, after which the final image is developed in yellow coloring developer, followed by fixation in hypo. The silver may be removed all together finally, or single silver images may be removed earlier as desired, exposure through a silver-plus-color image giving a greater degree of correction than through the coloring matter alone. After printing from this color-negative film, developing, and fixing, the print may be treated similarly if, as is usually the case, it requires similar correction.

This controlled-diffusion process may also be applied in the case hereinbefore described where the reversal method is used, that is, where the original negative images have been developed and dissolved out. However, in this case the negative images are not fixed and the residual silver halide is developed in cyan-coloring developer. Otherwise the procedure is the same as described in the preceding paragraph.

It should be understood that the present disclosure is for the purpose of illustration only and that this invention includes all modifications and equivalents which fall within the scope of the appended claims.

I claim:

1. In the art of color photography on silver halide emulsion the method which comprises exposing a sensitized layer of emulsion to one color aspect, while leaving in said layer an amount of unexposed silver halide forming a corresponding positive, and emulsion in addition to that amount, developing said layer into a negative, removing the silver from the developed negative, exposing said silver halide from one side in register through a positive of another color aspect, the latter exposure being incomplete, and the emulsion therefore correctively affected by the light absorption of said positive, and again developing said layer whereby a corrected positive of said first color aspect is formed.

2. In the art of color photography on silver halide emulsion the method which comprises exposing from one side a sensitized layer of emulsion to one color aspect, while leaving in said layer an amount of unexposed silver halide forming a corresponding positive, and emulsion in addition to that amount, developing said layer to form a negative, removing the silver from the developed negative, again exposing said layer from the other side in register through a positive of another color aspect, the latter exposure being incomplete, and the emulsion therefore correctively affected by the light absorption of said positive, and again developing said layer whereby a corrected positive of said first color aspect is formed.

3. The art of processing monopack film of the type having different layers differently sensitized, characterized in that, subsequent to the original exposure of all the layers, all the layers are developed and bleached, a colored positive is formed in one of said layers, another one of said layers is incompletely exposed in register from one side through said positive to correct for imperfection of color absorption, and a colored positive is then developed in the latter layer.

4. In the art of processing monopack film having different layers, the method which comprises exposing said layers to different color aspects to produce negatives, leaving in each layer sufficient medium to form a positive corresponding to the respective negative, developing and bleaching said negatives, producing a corresponding colored positive in said medium of one layer, exposing said medium of another layer in register from one side through said positive, the latter exposure being incomplete, and the emulsion therefore correctively affected by the light absorption of said positive, and then developing the latter layer to form another colored positive.

5. In the art of processing monopack film of the type having different layers differently sensitized to produce superposed images of different color aspects, the images to be differently colored with coloring-matters one of which is imperfect in that it absorbs light of that color which only another of the images should absorb, the method characterized in that, subsequent to the original exposure, all the layers are developed and bleached thereby providing positive records in the form of light sensitive emulsion, a light absorbing positive is formed from one of said records in a layer which is to contain imperfect coloring-matter, and the unexposed emulsion record in another one of said layers is then incompletely exposed from one side through said positive to correct for said deficiency.

6. In the art of processing film of the type having a layer sensitized to light of one color and a second layer differently sensitized to light of colder color, the method which comprises partially exposing said layers, from the side of said second layer, to light of said colors respectively, representing two color aspects of the object field, said partial exposure leaving an amount of unexposed silver halide forming a corresponding positive in the respective layer and leaving unexposed halide in addition to that amount, developing and bleaching both layers, forming a positive of the first color aspect in said first layer, incompletely exposing said second layer from the opposite side in register through said positive to correct for imperfection of color absorption, and then forming a corrected positive of the colder color aspect in the second layer.

7. In the art of processing film of the type having a transparent base and, on one side of the base, a layer sensitized to light of warm color, a second superposed layer differently sensitized to light of colder color and an intermediate layer differently sensitized to light of intermediate color, the method which comprises partially exposing said layers, from the side opposite said base, to light of said colors respectively representing three color aspects of the object field, said partial exposure leaving an amount of unexposed silver halide forming a corresponding positive in the respective layer and leaving unexposed silver halide in addition to that amount, developing all layers and removing the developed silver, forming a positive of the first color aspect in said first layer, incompletely exposing said intermediate layer from the opposite side through said base and said positive, forming a corrected positive of the intermediate color aspect in said intermediate layer, incompletely exposing said second layer through said positives, and then forming a corrected positive of the colder color aspect in said second layer.

8. In the art of color photography the method which comprises exposing a sensitized layer of emulsion to one color aspect, while leaving in said layer an amount of unexposed emulsion forming a corresponding positive, and emulsion in addition to that amount, developing said layer into a negative, rendering said negative photographically substantially ineffective, exposing said unexposed emulsion from one side in register through a positive of another color aspect, the latter exposure being incomplete and the emulsion therefore correctively affected by the light absorption of said positive, and developing the exposed emulsion in said layer whereby a corrected positive of said first color aspect is formed.

9. The art of processing monopack film of the type having different layers differently sensitized, characterized in that, subsequent to the original exposure of all the layers a positive image is developed in one of said layers and its corresponding negative rendered photographically substantially ineffective, a positive image consisting of unexposed emulsion is formed in another layer and the exposed emulsion of that layer rendered photographically substantially ineffective, whereupon said other layer is incompletely exposed from one side in register through said positive image, and developed, whereby imperfection of color absorption of the finished product is corrected.

10. In the art of processing monopack film having different layers, the method which comprises exposing said layers to different color aspects to produce negatives, leaving in each layer sufficient medium to form a positive corresponding to the respective negative, developing said negatives and rendering them photographically substantially ineffective, forming a printing positive in one layer, exposing another layer from one side in register through said printing positive, the latter exposure being incomplete, and the emulsion therefore correctively affected by the light absorptive of said positive, and then developing the latter layer to form another positive.

11. In the art of processing monopack film of the type having different layers differently sensitized to produce superposed images of different color aspects, the images to be differently colored with coloring-matters one of which is imperfect in that it absorbs light of that color which only another of the images should absorb, the method characterized in that, subsequent to the original exposure, one of said layers containing a positive image in sensitive emulsion and the rest of the emulsion in photographically substantially ineffective form is incompletely exposed, from one side, through a positive image formed in another layer by the imperfect coloring-matter, to correct for said deficiency.

EASTMAN A. WEAVER.